United States Patent
Tang et al.

(10) Patent No.: US 11,636,000 B2
(45) Date of Patent: Apr. 25, 2023

(54) METHOD, DEVICE, AND COMPUTER PROGRAM PRODUCT FOR MANAGING PROCESSES BASED ON READING SPEED OF A MESSAGE QUEUE

(71) Applicant: EMC IP Holding Company LLC, Hopkinton, MA (US)

(72) Inventors: Jun Tang, Chengdu (CN); Wei Wang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 95 days.

(21) Appl. No.: 16/802,430

(22) Filed: Feb. 26, 2020

(65) Prior Publication Data

US 2021/0117253 A1    Apr. 22, 2021

(30) Foreign Application Priority Data

Oct. 21, 2019    (CN) .......................... 201911001829.2

(51) Int. Cl.
*G06F 9/54* (2006.01)
*G06F 9/50* (2006.01)
*G06F 9/48* (2006.01)

(52) U.S. Cl.
CPC ............ *G06F 9/546* (2013.01); *G06F 9/4837* (2013.01); *G06F 9/4887* (2013.01); *G06F 9/5027* (2013.01)

(58) Field of Classification Search
CPC ...... G06F 9/546; G06F 9/5027; G06F 9/4887; G06F 9/4837; G06F 9/4881; G06F 2209/5018; G06F 2209/548
See application file for complete search history.

(56) References Cited

U.S. PATENT DOCUMENTS 6,990,669 B1 * 1/2006 Ballantyne ............ G06F 9/4887
718/107
10,924,438 B2 * 2/2021 Kwong .................. H04L 49/355
(Continued)

FOREIGN PATENT DOCUMENTS

CN      109240836 A  *  1/2019
WO    WO2021000693 A1 *  1/2021

OTHER PUBLICATIONS

Wei et al. CN109240836A Description Translation, Jan. 18, 2019, [database online], [retrieved on Jul. 6, 2021], Retrieved from Espacenet using Internet <URL:https://worldwide.espacenet.com/publicationDetails/description?CC=CN&NR=109240836A&KC=A&FT=D&ND=3&date=20190118&DB=&locale=en_EP>, pp. 1-18 (Year: 2019).*

(Continued)

*Primary Examiner* — Meng Ai T An
*Assistant Examiner* — Hsing Chun Lin
(74) *Attorney, Agent, or Firm* — Womble Bond Dickinson (US) LLP (57) ABSTRACT

Method, device, and computer program product for managing processes are disclosed. The method may include, in response to detecting a job to be executed in a job processing system, determining attribute information related to execution of a message queue in the job processing system; and determining, based on the attribute information, allocation information for a process to execute the job. The number of processes can be dynamically adjusted according to the current processing capacity of the job processing system, thereby improving the use of the resources of the job processing system and meanwhile avoiding crashing of the job processing system.

14 Claims, 6 Drawing Sheets

(56) References Cited

U.S. PATENT DOCUMENTS

| | | | | |
|---|---|---|---|---|
| 2015/0244622 A1* | 8/2015 | Wu | ................... | H04L 47/12 |
| | | | | 370/235 |
| 2017/0134330 A1* | 5/2017 | Clark | ................ | H04L 51/26 |
| 2020/0019449 A1* | 1/2020 | Guo | ................... | G06F 9/542 |

OTHER PUBLICATIONS

Lu et al. WO2021000693A1 Description Translation, Jan. 7, 2021, [database online], [retrieved on Jul. 12, 2021], Retrieved from Espacenet using Internet <URL:https://worldwide.espacenet.com/publicationDetails/description?CC=WO&NR=2021000693A1&KC=A1&FT=D&ND=4&date=20210107&DB=&locale=en_EP>, pp. 1-30 (Year: 2021).*

* cited by examiner

METHOD, DEVICE, AND COMPUTER PROGRAM PRODUCT FOR MANAGING PROCESSES BASED ON READING SPEED OF A MESSAGE QUEUE

CROSS-REFERENCE TO RELATED APPLICATION

This patent application claims priority, under 35 U.S.C. § 119, of Chinese Patent Application No. 201911001829.2, filed Oct. 21, 2019, which is incorporated by reference herein in its entirety.

FIELD

Embodiments of the present disclosure generally relate to the field of information processing, and more specifically to a method, device, and computer program product for managing processes.

BACKGROUND

A Massive/Multiple Parallel Processing (MPP) system such as a data protection system is able to backup lots of devices simultaneously. However, the maximum number of concurrent processes actually allowed by the system is affected by various factors, such as CPU, memory, disk input/output (IO), IO throughput, resource handlers, network latency, size of data to be processed, type distribution of the data to be processed, other processing running on the server, external system synchronization, and other factors. Therefore, for a job processing system (e.g., a backup system) running on customers' various hardware/solution environments, the maximum number of concurrent processes it actually allows is hard to be determined.

In current job processing systems, the solution for managing the number of concurrent processes is just setting a default maximum number of processes (also referred to as hard coded "magic number"). The default maximum number of processes is obtained through testing experience and cannot be obtained from customers' different deployment environments. Currently, there is no solution to solve this problem.

SUMMARY

Embodiments of the present disclosure provide a method, device, and computer program product for managing processes.

In a first aspect of the present disclosure, there is provided a method of managing processes. The method comprises: in response to detecting a job to be executed in a job processing system, determining attribute information related to execution of a message queue in the job processing system; and determining, based on the attribute information, allocation information for a process to execute the job.

In a second aspect of the present disclosure, there is provided an electronic device. The device comprises: at least one processing unit; and at least one memory, coupled to the at least one processing unit and storing instructions executed by the at least one processing unit, the instructions, when executed by the at least one processing unit, causing the device to perform acts, the acts comprising: in response to detecting a job to be executed in a job processing system, determining attribute information related to execution of a message queue in the job processing system; and determining, based on the attribute information, allocation information for a process to execute the job.

In a third aspect of the present disclosure, there is provided a computer program product. The computer program product is tangibly stored on a non-transitory computer-readable medium and comprises machine-executable instructions. The machine-executable instructions, when executed by a device, cause the device to perform any step of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objectives, features and advantages of the present disclosure will become more apparent, in which the same reference numerals typically refer to the same components in the example embodiments of the present disclosure.

Throughout the figures, the same or corresponding numerals denote the same or corresponding parts.

DETAILED DESCRIPTION OF EMBODIMENTS

Some preferred embodiments will be described in more detail below with reference to the accompanying drawings. Although the preferred embodiments of the present disclosure are illustrated in the drawings, it should be appreciated that the present disclosure can be implemented in various manners, and thus should not be construed to be limited to embodiments disclosed herein. Rather, these embodiments are provided to disclose the present disclosure more thoroughly and completely, and to convey the scope of the present disclosure fully to those skilled in the art.

As used herein, the terms "comprise" and its variants are to be read as open-ended terms that mean "include, but is not limited to." Unless otherwise specified, the term "or" is to be read as "and/or." The term "based on" is to be read as "based at least in part on". The term "one example embodiment" and "one embodiment" are to be read as "at least one embodiment." The term "another embodiment" is to be read as "at least one other embodiment." The terms "first," "second" and the like may refer to different or same objects. Other definitions, explicit and implicit, might be included below.

As mentioned above, the maximum number of concurrent processes actually allowed by a job processing system is affected by various factors, such as CPU, memory, disk input/output (IO), IO throughput, resource handlers, network latency, size of data to be processed, type distribution of the data to be processed, other processing running on the server, external system synchronization, and other factors. Therefore, for a job processing system (e.g., a backup system) running on customers' various hardware/solution environments, the maximum number of concurrent processes it actually allows is hard to determine.

In current job processing systems, the solution for managing the number of concurrent processes is just setting a default maximum number of processes (also referred to as hard coded "magic number"). The default maximum number of processes is obtained through testing experience. When the job processing system is deployed in different customer environments, the default maximum number of processes might not be applicable for the customer's environment, which will lead to serious problems. On the one hand, if the set default maximum number of processes is lower than the number of processes that can be actually run by the job processing system, the resources of the system are wasted, and the customer's job processing requirements might not be satisfied. On the other hand, if the default maximum number of processes is higher than the capacity that the job processing system can carry, the job processing system will be halted due to out of computing resource, when the jobs rush in and make the resources occupied by the parallel job processing processes exceed the system's capacity. This might cause an even worse situation of system crashing. For example, the job processing system hangs or crashes since too many jobs are processed at a specified time point. Currently, there is no solution to solve this problem.

Embodiments of the present disclosure propose a solution for managing processes to address one or more of the above and other potential problems. According to the solution, it is possible to dynamically adjust the number of processes according to the current processing capacity of the system, thereby maximizing the use of the resources of the job processing system, maintaining good performance and meanwhile avoiding the crashing of the job processing system.

Figure 1:
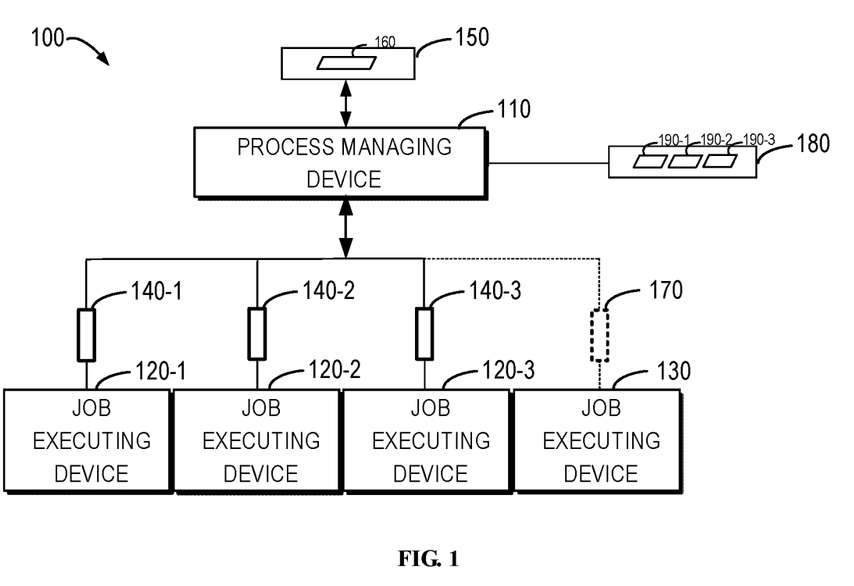
FIG. 1 illustrates a block diagram of an example job processing system in which embodiments of the present disclosure can be implemented.

FIG. 1 illustrates a block diagram of an example job processing system 100 in which embodiments of the present disclosure can be implemented. As shown in FIG. 1, the job processing system 100 includes a process managing device 110 and one or more of running job executing devices 120-1 to 120-3 (collectively referred to as running job executing device 120). The job processing system 100 further includes a job executing device 130 to be run. Various methods according to embodiments of the present disclosure may be implemented at the process managing device 110.

As shown in FIG. 1, the process managing device 110 has allocated several running processes 140-1 to 140-3 (collectively referred to as running process 140) to serve the running job executing device 120 (for example, to back up the data on the job executing device 120). When detecting that there is a job to be executed 160 in a job waiting queue 150, the process managing device 110 can determine, according to attribute information related to the execution of a message queue 180, whether to allocate a process 170 to execute the job 160 on the job executing device 130. The message queue 180 may contain a plurality of messages 190-1 to 190-3 (collectively referred to as message 190).

It should be appreciated that the structure of the job processing system 100 is described for exemplary purposes only, and does not imply any limitation on the scope of the present disclosure. For example, the embodiments of the present disclosure may also be applied to a system different from the job processing system 100. It should be appreciated that the specific numbers of the above devices, processes, messages and jobs are given for illustrative purposes only, and do not imply any limitation on the scope of the disclosure.

In some embodiments, the job may be for example a backup job, and the backup job may be a job that is generated according to a predetermined policy and specifies when to execute a backup job on which device or devices. The process managing device 110 may be, for example, a computer, a virtual machine, a server, or the like, and the present disclosure is not limited in this regard. The job executing device 120 is a device on which a job is to be executed, for example, a device that stores data, assets, etc. to be protected, and is to be backed up. The job executing device 120 may be, for example, a computer, a virtual machine, a server, or the like, and the present disclosure is not limited in this regard. The process managing device 110 and the job executing device 120 communicate with each other through a network. The network may be, for example, an Internet, an intranet, or the like.

Figure 2:
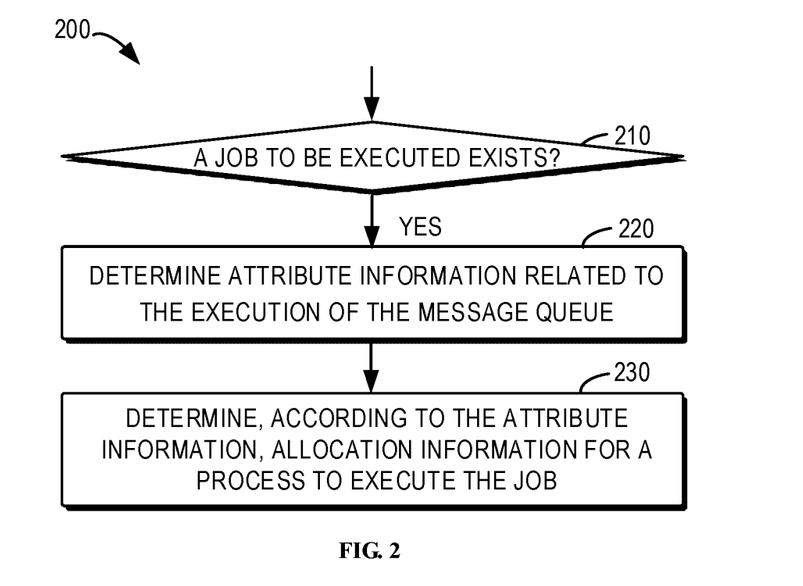
FIG. 2 illustrates a flowchart of an example method of managing processes according to an embodiment of the present disclosure.

FIG. 2 illustrates a flowchart of an example method 200 of managing processes according to an embodiment of the present disclosure. For example, the method 200 may be performed by the process managing device 110 as shown in FIG. 1. It should be appreciated that the method 200 may also be performed by other devices, and the scope of the present disclosure is not limited in this regard. It should also be appreciated that the method 200 may further include additional acts not shown and/or the acts shown may be omitted, and the scope of the present disclosure is not limited in this regard.

The method 200 is described in detail below with reference to FIG. 1 and FIG. 2.

At 210, the process managing device 110 detects whether a job to be executed 160 exists in the job processing system 100. In some embodiments, the process managing device 110 may periodically detect whether there is a job to be executed 160 in the job waiting queue 150 in the job processing system 110, and the job to be executed 160 may be placed in the waiting queue 150 according to a policy or a schedule. Alternatively or additionally, in other embodiments, the process managing device 110 may receive a notification when the job to be executed 160 is generated. Additionally, in still other embodiments, the process managing device 110 may receive a notification when a running process 140 is released, thereby detecting whether there is a job to be executed 160 in the waiting queue 150 at that time.

If a job to be executed 160 is detected by the process managing device 110, the process managing device 110 determines at 220 attribute information related to the execution of the message queue 180 in the job processing system 100.

In some embodiments, the message queue 180 may be in the process managing device 110. Alternatively, in other embodiments, the message queue 180 may also be in other devices (not shown) in the job processing system 100. In some embodiments, for processing each message 190, almost the same computing resources to be used is required by the process managing device 110, irrelevant to any characteristic of the job itself. Additionally, in other embodiments, the message 190 may be information that is sent by the job executing device 120 to the process managing device 110 and indicates a status of the job being executed or the job whose execution has been completed. Additionally, in still other embodiments, the process managing device 110 may update the status and progress of the job being executed according to the information read from the message 190, synchronize the message to an external system, and save jobs whose execution has been completed to a database, etc.

In some embodiments, the attribute information related to the execution of the message queue 180 may be the speed at which the message queue 180 is read. As mentioned above, the process/thread 140 for executing jobs requires various resources and is very complicated, so it is difficult to directly measure the resource consumption of the process. However, the processing for each message 190 is almost the same and consumes almost the same computing resources. Therefore, the reading speed for the message queue 180 may indicate the performance of the job processing system 100 in processing jobs.

Additionally or alternatively, in still other embodiments, the attribute information may be a rate of change in speed at which the message queue 180 is read. The rate of change in speed may indicate whether the speed at which the message queue 180 is read is increasing or decreasing. How to determine the speed and the rate of change in speed at which the message queue 180 is read will be described in detail below when describing FIG. 3 and FIG. 4 respectively.

Additionally or alternatively, in yet other embodiments, the attribute information may be a total number of messages 190 in the message queue 180. The total number may indicate whether there is congestion message in the message queue 180.

At 230, the process managing device 110 determines, according to the attribute information, allocation information for a process 170 to execute the job to be executed.

In some embodiments, the process managing device 110 may compare the speed at which the message queue 180 is read with a predetermined threshold of speed. If the speed at which the message queue 180 is read is greater than the predetermined threshold of speed, it means that the process managing device 110 is able to carry more processes. The process managing device 110 may then determine to allocate the process 170 for the job.

Additionally or alternatively, in yet further embodiments, the process managing device 110 may compare the rate of change in speed at which the message queue 180 is read with a predetermined threshold of rate of change. If the rate of change in speed is greater than the predetermined threshold of rate of change, it means that the speed at which the message queue 180 is read is increasing, and even if the speed at which the message queue 180 is read is not greater than the predetermined threshold of speed, the process managing device 110 may still determine to allocate the process 170 for the job. Conversely, if the speed at which the message queue 180 is read is not greater than the predetermined threshold of speed, and the rate of change in speed is not greater than the predetermined threshold of rate of change, it means that the speed at which the message queue 180 is read is decreasing, and the job processing system 100 is approaching the maximum number of parallel processes it can execute. Executing more jobs will not improve the overall processing speed, instead, it will reduce the processing speed for all jobs due to a system crash. Therefore, the process managing device 110 may determine not to allocate the process 170 for the job, until the running process 140 is released when the job being executed is completed.

Additionally or alternatively, in still other embodiments, the process managing device 110 may determine whether the total number of messages 190 in the message queue 180 is less than a predetermined threshold of number. If the total number is less than the predetermined threshold of number, it means that the message queue 180 maintains a good speed being read, and the messages 190 do not congest in the message queue 180. The process managing device 110 may directly determine to allocate the process 170 for the job.

Additionally, in some embodiments, the process managing device 110 may periodically update the predetermined threshold of speed mentioned above. Specifically, the process managing device 110 may average a plurality of speeds at which the message queue 180 is read within a time period, as the predetermined threshold of speed. Additionally or alternatively, in still other embodiments, in order to reduce the amount of calculation, the process managing device 110 may calculate, each time after determining a new speed at which the message queue 180 is read, a new predetermined threshold of speed, according to the current predetermined threshold of speed and the determined new speed. For example, the new predetermined threshold of speed may be calculated by the following equation:

$$v0_{new}=(v0_{old}*N+v)/(N+1) \quad (1)$$

where $v0_{old}$ is the current predetermined threshold of speed, N is the number of speeds used when determining $v0_{old}$, and v is the determined new speed.

Additionally, in some embodiments, an updating interval of the predetermined threshold of speed may be optimized based on a difference between the current predetermined threshold of speed and the new predetermined threshold of speed. For example, if the difference between the new predetermined threshold of speed and the current predetermined threshold of speed exceeds 5%, the next updating interval will be half the current interval. Conversely, if the difference is less than 5%, the next updating interval will double. As such, the cost of repeating the updating in the user's system can be finally minimized. It should be understood that the value of the difference is given for exemplary purposes only, and does not imply any limitation on the scope of the disclosure. The present disclosure is not limited in this regard.

In the above exemplary embodiments, by using attribute information related to the execution of the message queue to determine whether to allocate a process for a job, it can be achieved to dynamically adjust the number of processes according to the current processing capacity of the job processing system, maximize the use of resources of the job processing system, maintain good processing performance and meanwhile avoid the crashing of the job processing system.

Figure 3:
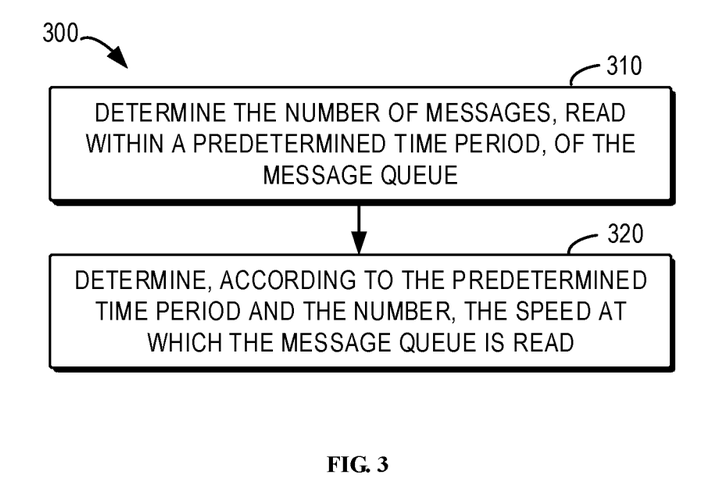
FIG. 3 illustrates a flowchart of an example method of determining a speed at which a message queue is read according to an embodiment of the present disclosure.

FIG. 3 illustrates a flowchart of an example method 300 of determining a speed at which a message queue is read according to an embodiment of the present disclosure. For example, the method 300 may be performed by the process managing device 110 as shown in FIG. 1. It should be understood that the method 300 may also be performed by other devices, and the scope of the present disclosure is not limited in this regard. It should also be understood that the method 300 may also include additional acts not shown and/or the acts shown may be omitted, and the scope of the present disclosure is not limited in this regard.

At 310, the process managing device 110 determines the number of messages 190, read within a predetermined time period, of the message queue 180.

In some embodiments, the process managing device 110 can record, when the messages 190 in the message queue 180 are read each time, a length of the message queue 180 at that time, that is, the number of messages to be read in the message queue 180. Then, the process managing device 110 may obtain respective lengths of the message queue 180 recorded within a predetermined time period when the job to be executed 160 is detected as described at 210, and then the process managing device 110 may calculate the number of messages 190 read within the predetermined time period according to the changes of lengths of the message queue 180.

In addition, as mentioned upon describing 230, in some embodiments, if the process managing device 110 determines that one of the obtained lengths of the message queue 180 is smaller than the predetermined threshold of number, it means that the message queue 180 maintains a good speed being read, and the messages 190 do not congest in the message queue. The process managing device 110 may directly determine to allocate the process 170 to execute the detected job to be executed 160 without determining the number of messages 190, read within the predetermined time period, of the message queue 180.

At 320, the process managing device 110 determines, according to the predetermined time period and the number, the speed at which the message queue 180 is read.

It is readily appreciated that the speed at which the message queue 180 is read may be obtained according to the predetermined time period and the number of messages read within the predetermined time period. For example, assuming that the predetermined time period is T and the number of messages read within the predetermined time period is M, the speed V at which the message queue 180 is read is determined as V=M/T.

Alternatively or additionally, in yet further embodiments, the process managing device 110 may determine a plurality of speeds at which the message queue 180 is read, and then determine an average speed according to the determined plurality of speeds. For example, assuming that the predetermined time period is Ts, the process managing device 110 may divide Ts into n time periods, which are represented by T1, T2, . . . , Tn, respectively, and then calculate speeds V1, V2, . . . , Vn corresponding to the n time periods respectively according to the above-mentioned method of calculating speed, and average the n speeds as the speed at which the message queue 180 is read.

Additionally, in still other embodiments, in order to improve computing efficiency, the process managing device 110 may store the calculated speed, and reuse the stored speed each time when the job to be executed 160 is detected, and calculate only the speed at which the message queue is read after the previous detection.

In the above exemplary embodiments, by determining the speed at which the message queue is read, it can be achieved to indirectly measure the current resource consumption of the system.

Figure 4:
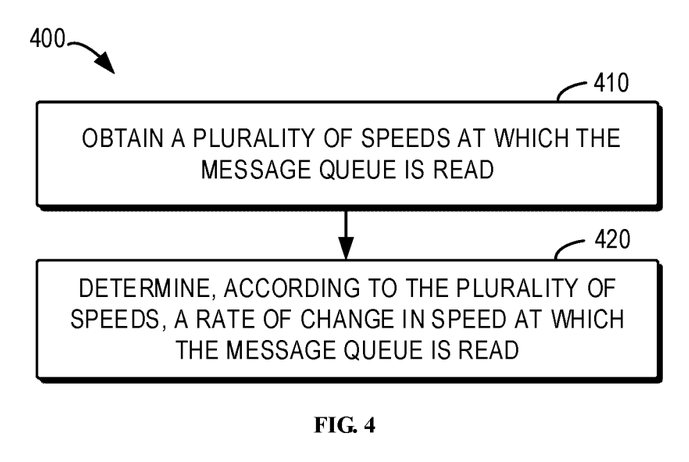
FIG. 4 illustrates a flowchart of an example method of determining a rate of change in speed at which a message queue is read according to an embodiment of the present disclosure.

FIG. 4 illustrates a flowchart of an example method 400 of determining a rate of change in speed at which a message queue is read according to an embodiment of the present disclosure. For example, the method 400 may be performed by the process managing device 110 as shown in FIG. 1. It should be understood that the method 400 may also be performed by other devices, and the scope of the present disclosure is not limited in this regard. It should also be understood that the method 400 may also include additional acts not shown and/or the acts shown may be omitted, and the scope of the present disclosure is not limited in this regard.

At 410, the process managing device 110 obtains a plurality of speeds at which the message queue 180 is read. The plurality of speeds correspond to different time periods, and each speed may be obtained through various implementations, for example, obtained in various ways similar to that described above with respect to 320, which will not be repeated here anymore.

At 420, the process managing device 110 determines, according to the plurality of speeds, a rate of change in speed at which the message queue 180 is read. In some embodiments, to determine the rate of change in speed, a linear fitting method may be employed. For example, assuming that the predetermined time period is Ts and the determined n speeds are V1, V2, . . . , Vn, the following equation may be used to calculate the linear fitting of the n speed samples:

$$f(x) = \beta_0 + \beta_1 x \qquad (2)$$

where $\beta_0$ and $\beta_1$ are regression coefficients; x represents the index of the speed samples, namely 1, 2, . . . , n; f (x) represents the determined n speeds, namely V1, V2, . . . , Vn. The $\beta_1$ obtained by substituting x and f(x) into the Equation (2) is the rate of change in speed. It should be understood that the linear fitting method for determining the rate of change in speed is described for exemplary purposes only, and does not imply any limitation on the scope of the present disclosure. For example, the rate of change in speed may also be determined by other methods, and the present disclosure is not limited in this regard.

Table 1 below shows the speed and the rate of change in speed at which the message queue is read, and the allocation information determined according to them in some embodiments.

TABLE 1

| $v/v_0$ | $\beta_1$ | Whether to allocate the process |
| --- | --- | --- |
| >1 | any | Yes |
| <=1 | >0 | Yes |
| <=1 | <=0 | No | where v is the speed at which the message queue is read as described with respect to 320, and $v_0$ is the predetermined threshold of speed. $\beta_1$ is the rate of change in speed at which the message queue is read as described above with respect to 420. Table 1 shows that when the speed at which the message queue is read is greater than a predetermined threshold of speed, the process managing device 110 determines to allocate the process for the job; when the speed at which the message queue is read is less than or equal to the predetermined threshold of speed, whether to allocate the process is determined according to whether the rate of change in speed is greater than 0 or less than or equal to 0.

In the above exemplary embodiments, the current actual processing capacity of the system may be better determined by determining the rate of change in speed at which the message queue is read, in conjunction with the speed at which the message queue is read.

Figure 5A:
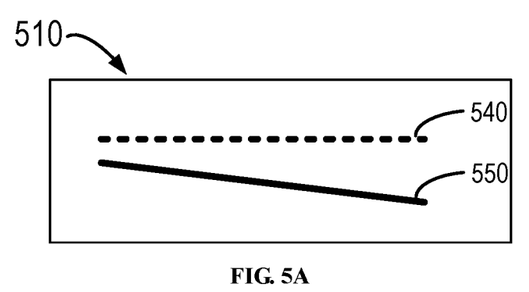
FIG. 5A to FIG. 5C illustrate respectively schematic diagrams of curves of a speed at which a message queue is read and a rate of change in speed according to an embodiment of the present disclosure.
Figure 5B:
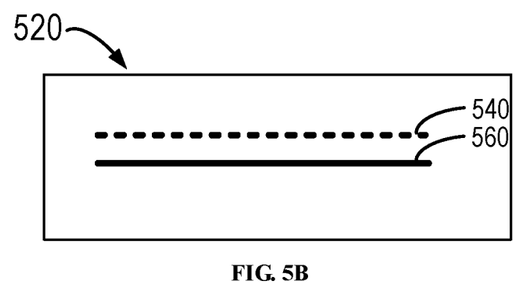
Figure 5C:
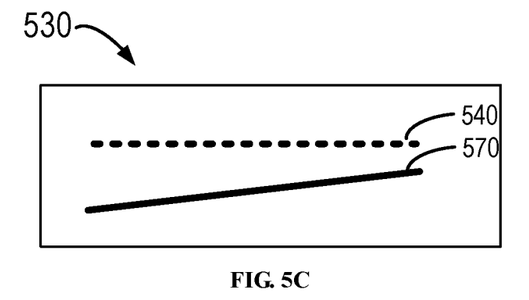

FIG. 5A to FIG. 5C illustrate respectively schematic diagrams of curves of a speed at which a message queue is read and a rate of change in speed according to an embodiment of the present disclosure.

As shown in FIG. 5, the predetermined threshold of speed is represented by a curve 540, and the linear fitting curves according to the speeds described above with respect to FIG. 4 are represented by 550, 560 and 570, respectively. FIG. 5A illustrates a case where the speed is less than a predetermined threshold of speed and the speed is decreasing. In this case, the process managing device 110 determines not to allocate the process 170 for the job. FIG. 5B shows a case where the speed is less than the predetermined threshold of speed and the speed is uniform. In this case, the process managing device 110 also determines not to allocate the process 170 for the job. FIG. 5C shows a case where the speed is less than the predetermined threshold of speed and the speed is increasing. In this case, the process managing device 110 determines to allocate the process 170 for the job.

Figure 6:
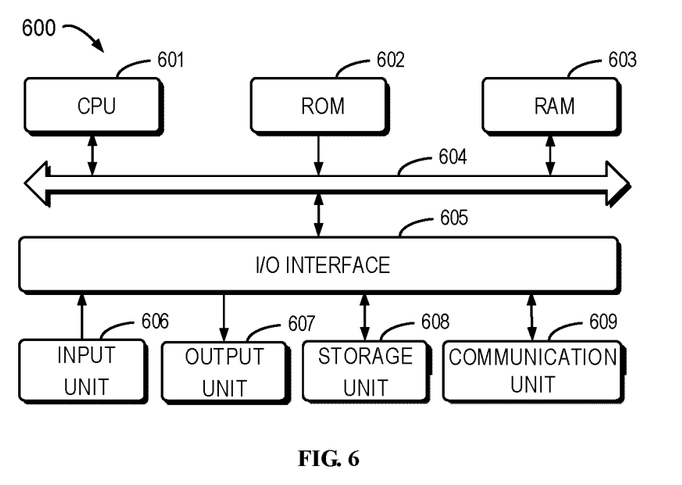
FIG. 6 illustrates a schematic block diagram of an example device that may be used to implement embodiments of the present disclosure.

FIG. 6 shows a schematic block diagram of an example device 600 that may be used to implement embodiments of the present disclosure. For example, the process managing device 110 shown in FIG. 1 may be implemented by the device 600. As shown in FIG. 6, the device 600 comprises a central processing unit (CPU) 601 which is capable of performing various appropriate acts and processes in accordance with computer program instructions stored in a read only memory (ROM) 602 or computer program instructions loaded from a storage unit 608 to a random access memory (RAM) 603. The RAM 603 stores therein various programs and data required for operations of the device 600. The CPU 601, the ROM 602 and the RAM 603 are connected to one another via a bus 604. An input/output (I/O) interface 605 is also connected to the bus 604.

Multiple components in the device 600 are connected to the I/O interface 605, comprising: an input unit 606, for example, a keyboard, a mouse, or the like; an output unit 607, such as various types of displays, a loudspeaker or the like; a storage unit 608, such as a disk, an optical disk or the like; and a communication unit 609, such as a LAN card, a modem, a wireless communication transceiver or the like. The communication unit 609 allows the device 600 to exchange information/data with other device via a computer network, such as the Internet, and/or various telecommunication networks.

The processes and processing described above, such as the methods, 200, 300 and 400, may be executed by the processing unit 601. For example, in some embodiments, the methods 200, 300 and 400 may be implemented as a computer software program, which is tangibly embodied on a machine-readable medium, e.g., the storage unit 608. In some embodiments, part or all of the computer programs may be loaded to and/or installed on the device 600 via the ROM 602 and/or the communication unit 609. The computer program, when loaded to the RAM 603 and executed by the CPU 601, may execute one or more acts of the methods 200, 300 and 400 as described above.

The present disclosure may be a method, a device, a system, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A method comprising:
   detecting a job to be performed at a job processing system that comprises a message queue and a plurality of job executing devices, wherein the message queue is populated with messages, corresponding to running jobs being executed by the plurality of job executing devices, that are read;
   determining, for each predetermined time period of a plurality of consecutive predetermined time periods, a number of messages read within a respective predetermined time period in the message queue to calculate a speed at which the message queue was read corresponding to the respective predetermined time period;
   determining, based on each speed corresponding to each predetermined time period, a rate of change in speed at which the message queue is read; and
   allocating a process on a job executing device of the plurality of job executing devices to execute the job and executing the job on the process in response to determining that the rate of change in speed at which the message queue is read is greater than a predetermined threshold of rate of change in speed at which the message queue is read.

2. The method according to claim 1, further comprising:
   determining a total number of the messages in the message queue.

3. The method according to claim 1, further comprising:
   determining whether a speed at which the message queue is read is greater than a predetermined threshold of speed; and
   in response to determining that the speed at which the message queue is read is greater than the predetermined threshold of speed, determining to allocate the process for the job.

4. The method according to claim 3, further comprising:
   in response to determining that the speed at which the message queue is read is less than or equal to the predetermined threshold of speed, determining whether the rate of change in speed at which the message queue is read is greater than the predetermined threshold rate of change in speed at which the message queue is read; and
   in response to determining that the rate of change in speed at which the message queue is read is greater than the predetermined threshold of rate of change in speed at which the message queue is read, determining to allocate the process for the job.

5. The method according to claim 1, further comprising:
   determining whether a total number of the messages is less than a predetermined threshold number; and
   in response to determining that the total number of the messages is less than the predetermined threshold of number, determining to allocate the process for the job.

6. An electronic device comprising:
   at least one processing unit; and
   at least one memory, coupled to the at least one processing unit and storing instructions executed by the at least one processing unit, the instructions, when executed by the at least one processing unit, causing the electronic device to perform acts, the acts comprising:
   detecting a job to be performed at a job processing system that comprises a message queue and a plurality of job executing devices, wherein the message queue is populated with messages corresponding to running jobs being executed by the plurality of job executing devices, that are read;
   determining, for each predetermined time period of a plurality of consecutive predetermined time periods, a number of messages read within a respective predetermined time period in the message queue to calculate a speed at which the message queue was read corresponding to the respective predetermined time period;

determining, based on each speed corresponding to each predetermined time period, a rate of change in speed at which the message queue is read; and allocating a process on a job executing device of the plurality of job executing devices to execute the job and executing the job on the process in response to determining that the rate of change in speed at which the message queue is read is greater than a predetermined threshold rate of change in speed at which the message queue is read.

7. The device according to claim 6, wherein the acts further comprise:

determining a total number of the messages in the message queue.

8. The device according to claim 6, wherein the acts further comprise:

determining whether a speed at which the message queue is read is greater than a predetermined threshold of speed; and in response to determining that the speed at which the message queue is read is greater than the predetermined threshold of speed, determining to allocate the process for the job.

9. The device according to claim 8, wherein the acts further comprise:

in response to determining that the speed at which the message queue is read is less than or equal to the predetermined threshold of speed, determining whether the rate of change in speed at which the message queue is read is greater than the predetermined threshold rate of change in speed at which the message queue is read; and in response to determining that the rate of change in speed at which the message queue is read is greater than the predetermined threshold of rate of change in speed at which the message queue is read, determining to allocate the process for the job.

10. The device according to claim 6, wherein the acts further comprise determining whether a total number of the messages is less than a predetermined threshold number; and in response to determining that the total number of the messages is less than the predetermined threshold of number, determining to allocate the process for the job.

11. A computer program product tangibly stored on a non-transitory computer-readable medium and comprising machine-executable instructions, the machine-executable instructions, when executed by a device, cause the device to perform operations comprising:

detecting a job to be performed at a job processing system that comprises a message queue and a plurality of job executing devices, wherein the message queue is populated with messages, corresponding to running jobs being executed by the plurality of job executing devices, that are read;

determining, for each predetermined time period of a plurality of consecutive predetermined time periods, a number of messages read within a respective predetermined time period in the message queue to calculate a speed at which the message queue was read corresponding to the respective predetermined time period;

determining, based on each speed corresponding to each predetermined time period, a rate of change in speed at which the message queue is read; and allocating a process on a job executing device of the plurality of job executing devices to execute the job and executing the job on the process in response to determining that the rate of change in speed at which the message queue is read is greater than a predetermined threshold rate of change in speed at which the message queue is read.

12. The computer program product according to claim 11, wherein the operations further comprise:

determining a total number of the messages in the message queue.

13. The computer program product according to claim 11, wherein the operations further comprise:

determining whether a speed at which the message queue is read is greater than a predetermined threshold of speed; and in response to determining that the speed at which the message queue is read is greater than the predetermined threshold of speed, determining to allocate the process for the job.

14. The computer program product according to claim 13, wherein the operations further comprise:

in response to determining that the speed at which the message queue is read is less than or equal to the predetermined threshold of speed, determining whether the rate of change in speed at which the message queue is read is greater than the predetermined threshold rate of change in speed at which the message queue is read; and in response to determining that the rate of change in speed at which the message queue is read is greater than the predetermined threshold rate of change in speed at which the message queue is read, determining to allocate the process for the job.

* * * * *